United States Patent
Brooks

(10) Patent No.: US 6,238,743 B1
(45) Date of Patent: May 29, 2001

(54) METHOD OF REMOVING A THERMAL BARRIER COATING

(75) Inventor: William C. Brooks, Lebanon, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/487,986

(22) Filed: Jan. 20, 2000

(51) Int. Cl.[7] ............................... B05D 3/10; C23G 1/02
(52) U.S. Cl. ..................... 427/307; 427/309; 427/327; 134/2; 134/3; 216/96; 216/100; 216/101
(58) Field of Search ..................... 134/2, 3; 427/307, 427/309, 327, 453; 252/79.1; 216/95, 96, 100, 101

(56) References Cited

U.S. PATENT DOCUMENTS

| | | | |
|---|---|---|---|
| 3,847,688 | * | 11/1974 | Gillice ........................... 156/2 |
| 4,181,623 | * | 1/1980 | Dillarstone et al. ............ 252/143 |
| 4,652,513 | * | 3/1987 | Pentak et al. ................... 430/258 |
| 5,028,385 | * | 7/1991 | Baldi ................................ 419/8 |
| 5,614,054 | * | 3/1997 | Reeves et al. .................. 156/344 |
| 5,643,474 | * | 7/1997 | Sangeeta ........................ 216/96 |
| 6,048,406 | * | 4/2000 | Misra et al. ...................... 134/2 |

* cited by examiner

Primary Examiner—Shrive Beck
Assistant Examiner—Jennifer Calcagni
(74) Attorney, Agent, or Firm—Andrew C. Hess; Gerry S. Gressel

(57) ABSTRACT

A method of removing a ceramic coating, such as a thermal barrier coating (TBC) of yttria-stabilized zirconia (YSZ), from the surface of a component, such as a gas turbine engine component. The method generally entails subjecting the ceramic coating to an aqueous solution of ammonium bifluoride, optionally containing a wetting agent, such as by immersing the component in the solution while maintained at an elevated temperature. Using the method of the invention, a ceramic coating can be completely removed from the component and any cooling holes, with essentially no degradation of the bond coat.

7 Claims, 1 Drawing Sheet

METHOD OF REMOVING A THERMAL BARRIER COATING

FIELD OF THE INVENTION

The present invention relates to methods for removing ceramic coatings. More particularly, this invention is directed to a method for removing a layer of thermal-insulating ceramic material, such as yttria-stabilized zirconia (YSZ) from the surface of a component intended for service at high temperatures, such as a component of a gas turbine engine.

BACKGROUND OF THE INVENTION

Components located in certain sections of gas turbine engines, such as the turbine, combustor and augmentor, are often thermally insulated with a ceramic layer in order to reduce their service temperatures, which allows the engine to operate more efficiently at higher temperatures. These coatings, often referred to as thermal barrier coatings (TBC), must have low thermal conductivity, strongly adhere to the article, and remain adherent throughout many heating and cooling cycles.

Coating systems capable of satisfying the above o requirements typically include a metallic bond coat that adheres the thermal-insulating ceramic layer to the component. Metal oxides, such as zirconia ($ZrO_2$) partially or fully stabilized by yttria ($Y_2O_3$), magnesia (MgO) or other oxides, have been widely employed as the material for the thermal-insulating ceramic layer. The ceramic layer is typically deposited by air plasma spraying (APS), low pressure plasma spraying (LPPS), or a physical vapor deposition (PVD) technique such as electron beam physical vapor deposition (EBPVD), which yields a strain-tolerant columnar grain structure. Bond coats are typically formed of an oxidation-resistant diffusion coating such as a diffusion aluminide or platinum aluminide, or an oxidation-resistant alloy such as MCrAlY (where M is iron, cobalt and/or nickel). Aluminide coatings are distinguished from MCrAlY coatings, in that the former are primarily aluminide intermetallic while the latter are a metallic solid solution that contains a mixture of phases, including βNiAl.

Though significant advances have been made with coating materials and processes for producing both the environmentally-resistant bond coat and the thermal-insulating ceramic layer, there is the inevitable requirement to remove and replace the ceramic layer under certain circumstances. For example, removal may be necessitated by erosion or impact damage to the ceramic layer during engine operation, or by a requirement to repair certain features such as the tip length of a turbine blade. Removal of the ceramic layer may also be necessitated during component manufacturing to address such problems as defects in the coating, handling damage and the need to repeat noncoating-related manufacturing operations which require removal of the ceramic, e.g., electrical-discharge machining (EDM) operations.

Current state-of-the-art repair methods often result in removal of the entire TBC system, i.e., both the ceramic layer and bond coat, after which the bond coat and ceramic layer must be redeposited. One such method is to use abrasives in procedures such as grit blasting, vapor honing and glass bead peening, each of which is a slow, labor-intensive process that erodes the ceramic layer and bond coat, as well as the substrate surface beneath the coating. With repetitive use, these procedures eventually destroy the component by reducing the wall thickness of the component. This disadvantage is particular acute with diffusion aluminide bond coats, which have a diffusion zone that extends into the substrate surface of the component. Damage to diffusion aluminide bond coats generally occurs by the fracturing of brittle phases in the diffusion zone, such as $PtAl_2$ phases of a platinum-aluminide bond coat, or in the additive layer, which is the outermost bond coat layer containing an environmentally-resistant intermetallic phase MAl, where M is iron, nickel or cobalt, depending on the substrate material. Damage is particularly likely when treating an air-cooled component, such as a turbine blade whose airfoil surfaces include cooling holes from which cooling air is discharged to cool the external surfaces of the blade.

Consequently, significant effort has been directed to developing nonabrasive processes for removing ceramic coatings. One such method is an autoclaving process in which the ceramic coating is subjected to elevated temperatures and pressures in the presence of a caustic compound. This process has been found to sufficiently weaken the chemical bond between the ceramic and bond coat oxide layers to permit removal of the ceramic layer while leaving the bond layer intact. However, suitable autoclaving equipment is expensive, and autoclaving techniques have been incapable of removing ceramic from the cooling holes of an air-cooled turbine blade.

Accordingly, what is needed is a process capable of removing a ceramic layer from a component without damaging an underlying substrate, including any bond coat used to adhere the ceramic layer.

SUMMARY OF THE INVENTION

The present invention provides a method of removing a ceramic coating, such as a thermal barrier coating (TBC) of yttria-stabilized zirconia (YSZ), from the surface of a component. Particularly notable examples are gas turbine engine components exposed to the hostile thermal environment of the turbine, combustor and augmentor sections of a gas turbine engine. The method is particularly suited for completely removing a thermal-insulating ceramic coating of a thermal barrier coating system without removing a metallic bond coat, such as a diffusion aluminide or MCrAlY coating, that adheres the ceramic coating to the surface of the component.

The method of this invention generally entails subjecting the ceramic coating to an aqueous solution of ammonium bifluoride. A preferred process for removing the ceramic coating further entails immersing the component in the solution while maintained at an elevated temperature, and subjecting the coating to ultrasonic energy. Using the method of this invention, a ceramic coating can be completely removed from the component and any cooling holes, with essentially no degradation of the bond coat. Accordingly, this invention allows the deposition of a new ceramic coating on components in production without refurbishment or replacement of the bond coat and without depositing additional ceramic in the cooling holes, which would be detrimental to the performance of the component. If the component has been in service, such that the bond coat has been partially depleted as a result of oxidation, the bond coat can be refurbished before replacing the ceramic coating.

A significant advantage of this invention is the reduced labor, equipment and processing costs required to remove a ceramic coating of a thermal barrier coating system. In addition to the simplified process and equipment that can be used, labor and process costs are further reduced by avoiding damage and removal of the bond coat. In addition, the service life of a component can also be extended by avoiding replacement of its entire thermal barrier coating system, since removal of a bond coat results in loss of wall thickness, particularly if the bond coat is a diffusion aluminide which inherently shares a significant diffusion zone with the component substrate. Importantly, prior art techniques for removing a ceramic layer of a TBC have typically been unable to remove ceramic from cooling holes, or have caused excessive damage to the bond coat in the process of removing the ceramic. By completely removing ceramic from the cooling holes of an air-cooled component, the performance of the component is improved by the restored uniform film cooling of its surfaces.

Other objects and advantages of this invention will be better appreciated from the following detailed description.

DETAILED DESCRIPTION OF THE INVENTION

Figure 1:
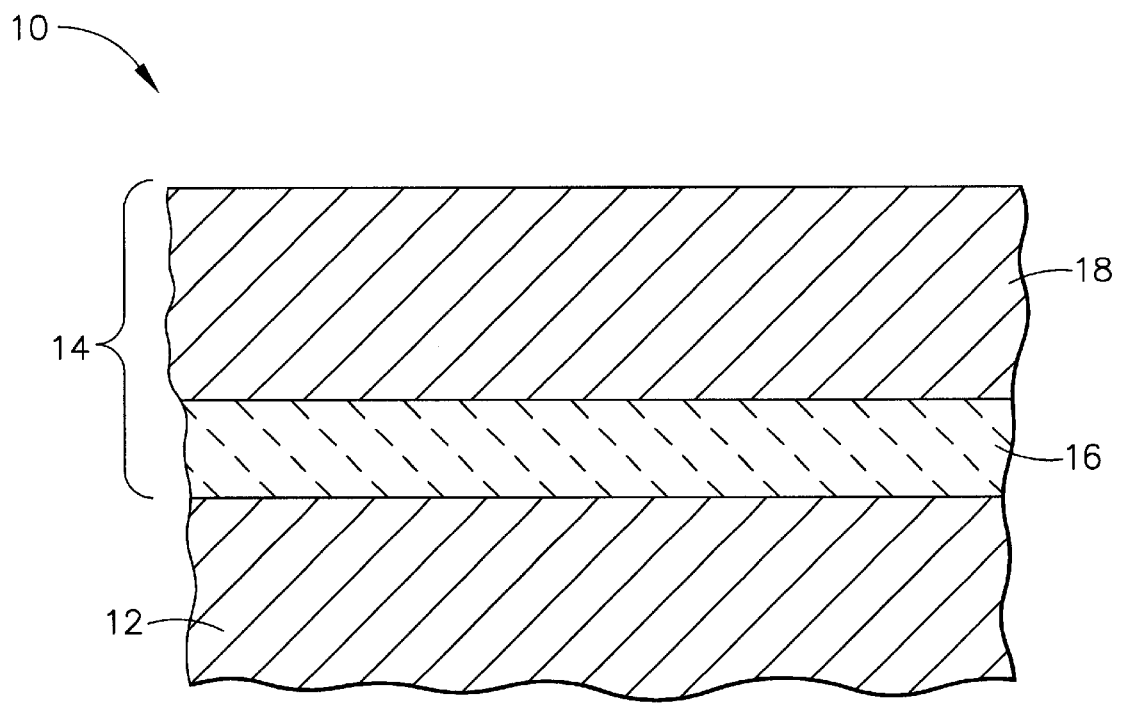
FIG. 1 is a sectional view of a surface portion of a gas turbine engine blade protected by a thermal barrier coating system that includes a ceramic layer adhered to the blade surface with a bond coat.

FIG. 1 represents a partial cross-sectional view of an airfoil portion of a gas turbine engine turbine blade 10. The substrate 12 of the blade 10 is shown as being protected by a thermal barrier coating system 14 composed of a ceramic layer 18 adhered to the substrate 12 by a bond coat 16. The method of this invention is directed to removing the ceramic layer 18 from the substrate 12 of the blade 10 without removing or damaging the bond coat 16.

As is the situation with high temperature components of a gas turbine engine, the blade 10 may be formed of an iron, nickel or cobalt-base superalloy. The bond coat 16 is an oxidation-resistant composition such as a diffusion aluminide and/or MCrAlY, both of which form an alumina ($Al_2O_3$) layer or scale (not shown) on its surface during exposure to elevated temperatures. The alumina scale protects the underlying superalloy substrate 12 from oxidation and provides a surface to which the ceramic layer 18 more tenaciously adheres. The ceramic layer 18 can be deposited by air plasma spraying (APS), low pressure plasma spraying (LPPS) or a physical vapor deposition technique, e.g., electron beam physical vapor deposition (EBPVD), which yields a strain-tolerant columnar grain structure (not shown). A preferred material for the ceramic layer 18 is zirconia partially stabilized with yttria (yttria-stabilized zirconia, or YSZ), though zirconia fully stabilized with yttria could be used, as well as zirconia stabilized by other oxides, such as magnesia (MgO), calcia (CaO), ceria ($CeO_2$) or scandia ($Sc_2O_3$).

The method of this invention entails removing the ceramic layer 18 without removing or damaging the bond coat 16, so that a new ceramic layer can be deposited on the original bond coat 16. According to this invention, the ceramic layer 18 is preferentially removed by exposure to an aqueous stripping solution of ammonium bifluoride ($NH_4HF_2$) at an elevated temperature. A suitable composition for the aqueous solution is about 20 to about 70 grams of ammonium bifluoride per liter of solution. To enhance the effectiveness of the solution, about 0.05 to about 0.2 volume percent of a wetting agent can be added to the solution. While not required, distilled or de-ionized water is preferred. Suitable wetting agents contain about 1 to 3 weight percent polyethylene glycol with the balance being octylphenoxy polyethoxyethanol, with a preferred wetting agent being available under the name TRITON X-100 from Union Carbide. A preferred composition for the stripping solution using the TRITON X-100 wetting agent is about 30 to about 40 grams of ammonium bifluoride per liter of solution, about 0.1 to about 0.2 volume percent TRITON X-100, and the balance distilled or de-ionized water.

An optional ingredient for the solution is acetic acid ($CH_3COOH$). A suitable composition for a stripping solution containing acetic acid is about 10 to about 20 grams acetic acid per liter of solution, about 20 to about 70 grams of ammonium bifluoride per liter of solution, about 0.05 to about 0.2 volume percent wetting agent, with the balance being essentially distilled or de-ionized water. Suitable stripping solutions have been prepared and used that contain, per liter of solution, about 16 grams of acetic acid and about 35 grams of ammonium bifluoride, about 0.1 volume percent of the TRITON X-100 wetting agent, with the balance being water.

A suitable temperature range for the stripping process of this invention is about 140° F. to about 170° F. (about 60° C. to about 77° C.), more preferably about 140° F. to about 155° F. (about 60° C. to about 68° C.). The stripping treatment of this invention also preferably includes the use of ultrasonic energy transmitted through the solution to the ceramic layer 18. Frequencies of about 20 kHz to 40 kHz have been found suitable for ultrasonic energy levels of about 50 to about 200 W per gallon (about four liters) of solution. The ultrasonic treatment can be continued until the ceramic layer 18 is completely removed or at least sufficiently loosened so that it can be removed by brushing or pressure spray rinsing, typically in about two to five hours. Without ultrasonic treatment, a total treatment duration of about four to about five hours is generally sufficient to weaken the chemical bond between the ceramic layer 18 and the alumina scale on the bond coat 16. It is foreseeable that longer or shorter durations may be preferred, depending on the properties of the particular coating system.

In practice, the stripping solution of this invention has been used to remove YSZ TBC from nickel-base superalloy airfoils without damaging an underlying platinum aluminide bond coat. Notably, TBC within the cooling holes of the airfoils was also removed, while portions of the bond coats within the holes and coated by the TBC, as well as uncoated bond coat within internal cooling passages of the airfoils, were not attacked. Following the treatment, the airfoils were successfully recoated with TBC without requiring any refurbishing of the bond coat. Because the stripping process of this invention completely removed the TBC from the cooling holes, the thermal performance of the airfoils was not impaired by the accumulation of excess TBC in the cooling holes. Furthermore, because the stripping process of this invention did not damage any portions of the bond coats, additional processing steps to repair or replace the bond coats were unnecessary. If the blades had been in service, such that the bond coats were partially depleted as a result of oxidation, the bond coats, whether a diffusion aluminide or MCrAlY-type, could be refurbished prior to TBC deposition using a diffusion aluminizing technique such as pack cementation or vapor phase aluminizing.

While the invention has been described in terms of a preferred embodiment, it is apparent that other forms could be adopted by one skilled in the art. Therefore, the scope of the invention is to be limited only by the following claims.

What is claimed is:

1. A method of removing a thermal-insulating yttria-stabilized zirconia (YSZ) layer from a gas turbine engine component without removing a metallic bond coat on a surface of the component that adheres the YSZ layer to the component, the method comprising the step of immersing the component in an aqueous solution comprising ammonium bifluoride, wherein the immersing step further comprises heating the component and the solution to a temperature of between 60° C. and 77° C.

2. A method according to claim 1, wherein the immersing step further comprises directing ultrasonic energy at the YSZ layer while the component is immersed in the solution.

3. A method according to claim 1, wherein the solution comprises 30 to 40 grams of ammonium bifluoride per liter of the solution.

4. A method according to claim 1, wherein the solution further comprises 10 to 20 grams of acetic acid per liter of the solution.

5. A method according to claim 1, wherein the immersing step comprises heating the component and the solution to a temperature of between 60° C. and 68° C.

6. A method according to claim 1, wherein the bond coat is a diffusion aluminide.

7. A method according to claim 1, further comprising the step of depositing a YSZ material on a surface of the bond coat exposed when the YSZ layer was removed.

* * * * *